United States Patent Office 3,690,938
Patented Sept. 12, 1972

3,690,938
REMOISTENABLE ADHESIVE COMPOSITION FOR PREPASTED WALL COVERINGS
Thomas G. Swift, Decatur, Ill., assignor to A. E. Staley Manufacturing Company, Decatur, Ill.
No Drawing. Filed Nov. 18, 1970, Ser. No. 90,862
Int. Cl. B66b 3/02
U.S. Cl. 117—122 S
4 Claims

ABSTRACT OF THE DISCLOSURE

A remoistenable adhesive composition particularly useful for prepasted wall coverings which includes a dry blend of a water soluble low viscosity starch, a low viscosity cellulose material such as hydroxyethyl cellulose, carboxymethyl cellulose or methyl cellulose ether, and a plasticizer such as sodium nitrate, urea, calcium chloride, glycerin or sodium methacrylate. The above blend may also include an extender material such as sodium methacrylate or a clay, or both in combination. The adhesive is not disturbed by further handling and can be applied to the wall covering either before or after printing the decorative surface. The wall coverings treated with this adhesive are easily applied when remoistened, because they have good "slip" properties. They are also easily removed after installation without the use of steam or other stripping agents, simply by pulling the covering away from the undersurface.

DISCLOSURE OF THE INVENTION

This invention is directed to a remoistenable adhesive which is particularly useful for strippable, prepasted, sheet-like wall coverings. The adhesive can be applied to the wall covering by the manufacturer of the wall covering in a one step operation, before the sheets have been printed, because the adhesive of the invention forms a flexible film on the surface which can pass through printing or finishing rollers without cracking, flaking or dusting. Until now, it was necessary for the paper manufacturer to send the uncoated wall paper stock to the wallpaper company for printing prior to the application of the adhesive. Applying the adhesive *after* printing can now be avoided, along with potential damage to the decorative surface, and the possibility of expensive discards. Most of the components of the adhesive are water-soluble, and the clay is water dispersible, so water can be used as the wetting agent to apply the wall covering at the point of use. When the adhesive coated wall covering made according to the invention is applied, it can be readily slipped into correct position on the wall surface being covered, because the adhesive exhibits excellent "slip" when remoistened.

In one embodiment, this adhesive is derived from a waxy maize starch which comprises at least 80% by weight amylopectin, and which has been hydrolyzed in a slurry with sulfuric acid, and then neutralized to a pH of 4.5–5.0 by adding an alkalizer, then filtered and dried. The starch derivative so made contains about 10–13% moisture after drying, which is considered acceptable for commercial purposes. The starch derivative is then mixed with methyl cellulose, powdered sodium nitrate and a number 2 coating clay. The above mixture can be shipped to the point of use as a powder. The powder is then dissolved in about 40–230% by weight, based on dry adhesive, of water to produce an aqueous solution which is applied to the reverse or back side of a wall covering stock and then dried.

When remoistened, the adhesive of the invention exhibits excellent "slip" properties while wet to aid in positioning the wall covering on the wall during installation. When dry, the covering adheres well to the wall, and when desired, the paper can be manually stripped from the wall without the requirement of a release agent. This adhesive is also useful for applying oversize, illustrated and printed coverings to large surfaces such as billboards used in advertising, where strippability is even more important because of the high frequency of change experienced. In this latter application, the surface of the covering should be resistant to moisture, or the installation should be in a sheltered area, such as an enclosed shopping arcade, air terminal, or rail terminal.

PRIOR ART

Remoistenable, pregummed tapes have been available for a number of years, and remoistenable prepasted wall papers have been made available within the fairly recent past. When first introduced, prepasted wall papers utilized starch/dextrin remoistenable gums as pastes. The starch had a tendency to retrograde and lose solubility upon aging, so that it was necessary to apply the prepasted paper within a short time after manufacture. Once installed, these papers were not easily strippable, because the adhesives tended to "set up" in a permanent, dry bond. The remoistenable adhesives developed for taping corrugated cartons, such as described in U.S. Pat. 2,976,178 do not "slip" when remoistened at the time of use. "Slip" is most important for printed and illustrated wall coverings because the designs from adjacent segments must be properly positioned to provide an acceptable overall appearance, and the edges of adjacent sheets require proper alignment.

Easy removal of ornamental wall coverings is also an important and desirable requirement, because it can be an important selling point to the "do-it yourself" home decorator who remembers the woes of removing old or unwanted wall coverings. Prior wall coverings have not been noted for their strippability, and the pregummed tape adhesives were never intended to be strippable because, in most package taping applications, a strong resistance to stripping is desired.

A water-remoistenable adhesive coating is described in U.S. Pat. 3,122,446, and it is stated that it is useful for wall coverings. However, the patent teaches a combination of a water insoluble layer of an acidic copolymer applied to the wallpaper substrate in a separate step, and an added layer of an alkaline substance to provide adhesiveness, and which is applied separately. The patent mentions the aging problem, especially when ammonia is used as the alkaline agent, and also states that the adhesive bond becomes insensitive to water upon aging (col. 2, lines 38–50). This statement indicates that the wall covering made as described was not truly strippable, and could only be removed with great difficulty. Canadian Pat. 852,128, issued Sept. 22, 1970, also describes an adhesive system which is applied in a multi-step operation. It would appear that this adhesive system also is not very strippable.

Another problem with the water-remoistenable adhesive coatings described in the prior art is the fact that they cannot ordinarily be printed *after* the adhesive has been applied. This necessitates extra handling of the wall covering stock material, since it must go from the manufacturer to the finisher, and then to the adhesive applicator equipment after printing to apply the adhesive backing. It is much more efficient and desirable to apply the adhesive backing to the stock material at the time of manufacture of the stock, possibly as a final step at the end of a continuous manufacturing line before the stock is first rolled for handling. Applying the adhesive *after* printing as in the prior art system also creates an additional risk of loss because of the already added value to the stock material by virtue of the printing or decorative coating operation. The prior art, multi-step applied adhesive backings tend to flake and powder when dry, and when run through the printing equipment, the adhesive tends to flake off and interfere with the decorative finishing of the wall covering. To avoid problems, excessive down time for cleanup is required during the finishing of the prior art wall coverings.

SUMMARY OF THE INVENTION

Applicant's invention provides a remoistenable adhesive composition which is especially useful for the manufacture of prepasted wall coverings including decorative wallpapers. This adhesive composition can be applied to the back surface of the wall covering stock material in a one-step operation prior to the decorative printing or coating step. The adhesive provides good slip properties when the wall covering is remoistened and applied to an undersurface or substrate such as wallboard, plaster or wood. The adhesive composition comprises a modified waxy maize starch or other amylopectin-type modified starch derivative containing at least about 80% by weight amylopectin which has been cooked to obtain a viscosity range useful in paper coating equipment, and which is water soluble, a slip agent, such as methyl cellulose, hydroxyethyl cellulose or carboxymethyl cellulose, a plasticizer, such as sodium nitrate, and an extender, such as clay or sodium methacrylate. The clay also modifies the degree of adhesive bonding of the wall covering to the substrate, and thereby can be used to increase the strippability of the wall covering.

Although a modified starch derivative containing as low as 80% by weight amylopectin will perform satisfactorily, a level of about 95% by weight amylopectin is preferred. The slip agents should exhibit a Brookfield viscosity at 2% solids in the range of 10–200 centipoises. In this connection, the degree of substitution (d.s.) for the respective alkyl groups on the cellulose molecule is approximately as follows: methyl cellulose—d.s. 1.64–1.92; hydroxyethyl cellulose—d.s. 0.70–1.50; and carboxymethyl cellulose—d.s. 0.35–0.95.

The adhesive composition of this invention overcomes the problems associated with prior prepasted wall coverings, which are normally coated with adhesive after printing. This adhesive may be applied at the point of manufacture of the basic stock material in a one-step operation, and subsequently printed or finished on the decorative surface, because the adhesive material forms a continuous flexible film on the stock material which remains in place through subsequent finishing operations, such as decorative printing. The addition of a water soluble slip agent such as methyl cellulose provides "slip," which greatly simplifies application of an adhesive backed wall covering to an undersurface, and the clay filler insures good strippability from the undersurface by limiting the adhesive bonding of the starch derivative to a desirable range which is sufficient to hold the wall covering in place, but sufficiently limited so that the covering can be removed manually without the application of steam or other extraordinary removal procedures.

The following specific examples of the invention are not intended to limit the invention in any way but serve to illustrate the method in more detail.

DETAILED DESCRIPTION OF THE INVENTION

Example 1

A slurry of waxy maize starch (22.5° Bé. at 60° F.) is first converted with sulfuric acid at about 126° F. for about 6–7 hours. The ratio of sulfuric acid (66° Bé. at 60° F.) should be approximately five parts to one hundred parts starch, dry substance basis. The reaction mixture should have a Brookfield viscosity after cooking of about 300–900 centipoises measured at 26% solids, using a Number 3 spindle at twenty revolutions per minute at 85° F. Approximately 3.8 parts of sodium hydroxide (d.s.b.) in a 5% solution is added to the slurry to adjust pH to 4.5–5.0. The product is then washed with water, centrifuged to remove salts, and then flash dried to about 10–13% moisture.

The converted starch is then blended with methyl cellulose, powdered sodium nitrate and a predispersed, number two coating clay in the following proportions:

|  | Percentage, as is basis |
|---|---|
| Modified | 29 |
| Methyl cellulose (d.s. 1.64–1.92) | 14 |
| Sodium nitrate (industrial grade) | 43 |
| Predispersed #2 coating clay | 14 |
| Total | 100 |

The above ingredients are dry mixed together in a ribbon blender. The blend is then screened through a #4 mesh screen, and the screened product is ready for shipment in moisture-proof bags to the point of use.

To apply the above dry mixture to the back surface of a wall covering, about 180 parts of the blend is first mixed with an equal, or slightly greater, amount of water for thirty minutes at room temperature. The aqueous mixture is then heated to about 190°–205° F., and maintained at this temperature for about thirty minutes. The aqueous mixture is then cooled to about 140–150° F. and applied to the back surface of the wall covering stock, by continuous brushing, spraying, or film coating with conventional coating equipment in a one-step application. The adhesive coating film is then dried either at an elevated temperature, or at room temperature. The adhesive coated stock is then ready for finishing operations such as printing, and for rolling for shipment, if printing and decorative finish is to be applied at a different location.

Example 2

The adhesive blend can be modified to the following proportions:

| Ingredients: | Percent (by wt.) |
|---|---|
| Acid hydrolyzed, waxy maize starch | 33 |
| Methyl cellulose (d.s. 1.64–1.92) | 17 |
| Sodium methacrylate | 50 |
| Total | 100 |

The preparation of the adhesive with water and the coating procedures are the same as described above. The sodium methacrylate serves as a plasticizer, replacing sodium nitrate, and it also functions as an extender to limit the adhesiveness of the modified starch. If used in sufficient amounts, as in this example, the addition of clay is unnecessary. The coating of the back surface of the wall covering stock is accomplished as described above and should be controlled to add a coating weight of about 8–20 pounds per 3,000 square feet of stock.

EXAMPLE 3

The same blend proportions as set forth in the Example 1 were dry blended, and then added to an equal, or slightly greater amount, of water which has been heated to about 180–212° F. A small amount of sodium hexametaphosphate (less than 0.5%) was added to the water to improve dispersibility. The mixture is stirred for 20–30 minutes, and the resulting adhesive is applied to a wall covering stock material as before. The temperature at which the adhesive coating is applied can be adjusted in the range of 40°–212° F. as desired.

EXAMPLE 4

The adhesive coating can also be blended using a cold water swelling low viscosity starch such as pregelatinized low viscosity waxy starch derivative using the following proportions in the dry blend:

| Ingredients: | Percent (by wt.) |
|---|---|
| Cold water swelling, waxy starch derivative | 29 |
| Methyl ether of cellulose (low viscosity) | 14 |
| Sodium nitrate | 43 |
| Predispersed No. 2 clay | 14 |
| Total | 100 |

The above blend is dispersed in an equal, or slightly greater, amount of water at room temperature and mixed until a smooth, uniform consistency is obtained. The adhesive coating is then applied to the back surface of the wall covering as before.

Melamine formaldehyde resin and ammonium nitrate can be added in progressively increasing amounts to retain the adhesive on the wall covering sheet during prolonged soaking for application to a wall. These additions may be necessary for optimum performance for those application systems incorporating a water box which actually soaks the wall covering in water just prior to application to a wall. Other insolubilizing agents may be used, such as urea formaldehyde, glyoxal, or any insolubilizing system which prevents the adhesive from dissolving away from the back surface of the wall covering during prolonged soaking. The amount of insolubilizing agent is determined by the particular system selected, and must be limited to an amount which is effective to retard the water solubility rate of the adhesive, but not to eliminate its remoistenability. For those applications which apply water with a brush, or where the sheets are dipped in water for a minute or less, the addition of the melamine formaldehyde resin is not necessary.

The prepasted, slippable, strippable wall covering made possible by the adhesive coating composition described above is applied (and removed) from wall surfaces more readily. The adhesive coating is applied to the back of the wall covering in a simple, one-step operation well suited to the base stock production line as a last step. The outer covering surface can be printed, decorated, or finished after the adhesive has been applied, and the adhesive coating will not "dust" off to interfere with the smooth, continuous operation of the finishing equipment.

Since many embodiments of this invention may be made and since many changes may be made in the embodiments described, the foregoing is to be interpreted as illustrative only and the invention is defined by the appended claims hereafter.

I claim:
1. A prepasted wall covering stock material comprising a sheet material having a front surface to receive a decorative finish and a back surface, said back surface being coated with a remoistenable adhesive material comprising a blend of the following materials, based on the weight of the dry solids adhesive mixture:
  (a) 30–40% of an acid hydrolyzed waxy maize starch;
  (b) 15–25% of a slip agent selected from the group consisting of cellulosic derivatives including methyl cellulose, hydroxyethyl cellulose, and carboxymethylcellulose;
  (c) 35–55% by weight dry solids, of a plasticizer selected from the group consisting of sodium methacrylate, potassium methacrylate;

and the above blend was dispersed in 40–230% by weight water, based on the dry adhesive mixture, said dispersion having been applied in aqueous form as a uniform film to the wall covering stock material, said film being sufficiently durable to allow subsequent decorative finishing of the front surface of the stock material.

2. The stock material of claim 1, including about 5% based on dry solids of the adhesive mixture of melamine formaldehyde resin and about 2% based on dry solids of adhesive material of ammonium nitrate added to the premixed dry blend of adhesive ingredients to increase adhesive retention on the back surface of the wall covering during prolonged soaking just prior to application of the wall covering to a wall surface.

3. The prepasted wall covering stock material of claim 1, in which the acid hydrolyzed waxy maize starch comprises an amylopectin-type, modified starch derivative containing at least 80% by weight amylopectin.

4. The stock material of claim 3, in which about 5–8% of an insolubilizing agent selected from the group consisting of urea formaldehyde, glyoxal, melamine formaldehyde resin and ammonium nitrate is added to improve adhesive retention on the back of the wall covering when soaked in water just prior to application of the wall covering to a substrate.

References Cited

UNITED STATES PATENTS

| 2,791,512 | 5/1957 | Hatch | 106—208 |
| 2,474,292 | 6/1949 | Weidner | 117—122 S |
| 3,501,424 | 3/1970 | Imoto | 106—214 |

FOREIGN PATENTS

| 626,290 | 7/1944 | Great Britain | 117—122 S |
| 524,741 | 2/1939 | Great Britain | 117—122 S |

THEODORE MORRIS, Examiner